C. K. GRIVE.
COOKING UTENSIL.
APPLICATION FILED JULY 11, 1912.
1,071,909.
Patented Sept. 2, 1913.
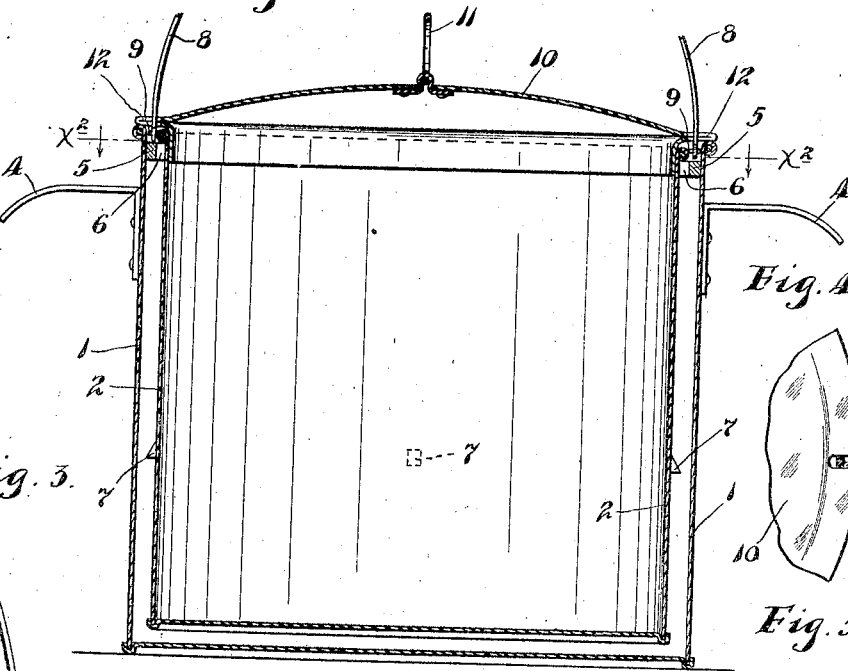
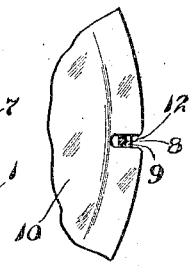
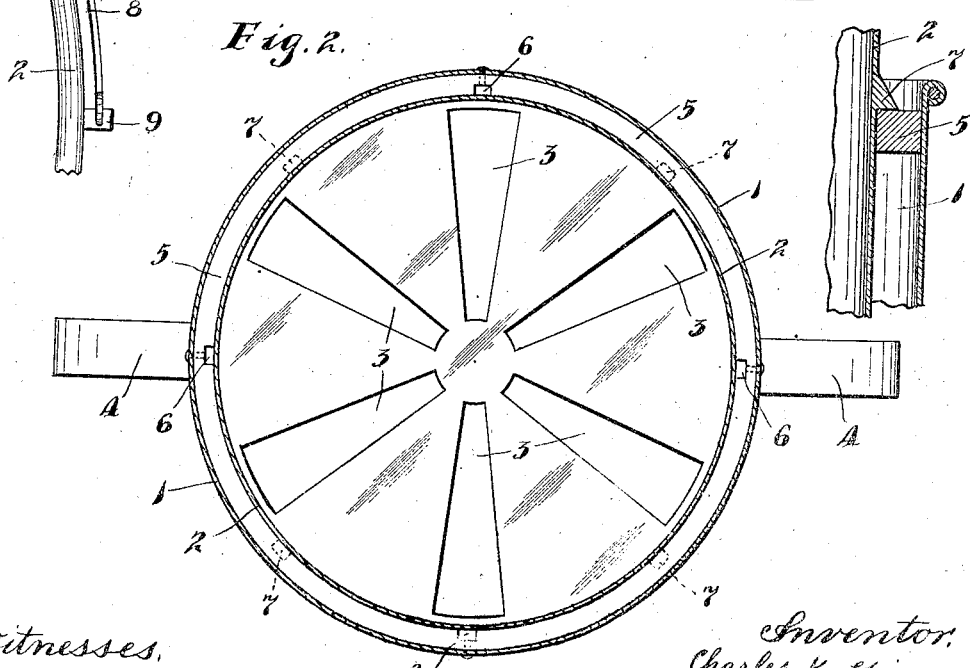
Witnesses
H. L. Opsahl.
E. C. Skinkle
Inventor
Charles K. Grive
By his Attorneys
Williamson Medland

UNITED STATES PATENT OFFICE.

CHARLES K. GRIVE, OF MINNEAPOLIS, MINNESOTA, ASSIGNOR OF ONE-HALF TO WILLIAM HULTGREN, OF MINNEAPOLIS, MINNESOTA.

COOKING UTENSIL.

1,071,909.

Specification of Letters Patent. Patented Sept. 2, 1913.

Application filed July 11, 1912. Serial No. 709,750.

*To all whom it may concern:*

Be it known that I, CHARLES K. GRIVE, a citizen of the United States, residing at Minneapolis, in the county of Hennepin and State of Minnesota, have invented certain new and useful Improvements in Cooking Utensils; and I do hereby declare the following to be a full, clear, and exact description of the invention, such as will enable others skilled in the art to which it appertains to make and use the same.

My invention has for its object to provide an improved cooking utensil, and to such ends, the invention consists of the novel devices and combinations of devices hereinafter described and defined in the claim.

The invention is illustrated in the accompanying drawings wherein like characters indicate like parts throughout the several views.

Referring to the drawings, Figure 1 is a vertical section taken through the improved cooking utensil; Fig. 2 is a horizontal section taken on the line $x^2—x^2$ on Fig. 1; Fig. 3 is a fragmentary view in plan showing a portion of the inner pot; Fig. 4 is a fragmentary view in plan showing a portion of the common cover for the inner and outer pots; and Fig. 5 is a fragmentary view in vertical section showing portions of the inner and outer pots.

The outer pot or vessel is indicated by the numeral 1 and the inner pot or vessel is indicated by the numeral 2. These two pots, so-called, may take various forms, but the inner pot must be considerably smaller than the outer pot, so as to leave space around the sides and at the bottom for water. The bottom of the inner pot 2 is formed with a multiplicity of perforations 3, preferably in the form of radial slots and of which there may be any desired number. The outer pot is shown as provided with lifting handles 4 and near its upper edge, it is provided with an internal rest ring or flange 5 secured thereto in any suitable way. This rest ring 5 is provided with a multiplicity of circumferentially spaced notches 6, of which, as shown, there are four, although, of course, the number may be varied.

The inner pot 2 is provided on its outer surface with supporting lugs 7 spaced to correspond to the perforations 6 and adapted to be moved upward through the said notches and then, by a slight turning of the inner pot, rest upon the body of the flange or ring 5. As shown, this inner pot 2 is provided with a lifting bail 8 pivotally connected to projecting lugs 9 thereof.

The numeral 10 indicates a cover having a depending flange adapted to telescope into the inner pot and having a wide outwardly projecting marginal flange adapted to overlap the upper edge of the outer pot 1 and to cover the annular water chamber which is between the two pots. As shown, this cover 10 is provided with a lifting ring or finger piece 11, and it is provided with diametrically opposite notches 12, which adapt the cover to be applied when the bail 8 is turned upward.

By reference to Fig. 1, it will be noted that the rest ring 5 is spaced below the upper edge of the outer pot 1 a distance sufficient to permit the lifting bail 8 to be turned downward into engagement with the rest ring 5 and to be completely covered by the marginal flange of the cover 10.

This cooking utensil is adapted for use in cooking various different kinds of vegetables or in cooking meats, and when the articles are placed within the inner pot 2, and the said pot is lowered into the outer pot, such articles will be submerged in the water contained in the outer pot and also within the inner pot. When it is desired to turn the water from the articles within the inner pot, the latter is lifted so that its lugs 7 are carried through the notches 6 and then by a slight rotation of the inner pot, the said lugs are turned onto the retaining flange 5 and will then support the inner pot above the water, thus causing the water to be drained from the articles within the inner pot. Also, when the inner pot is thus lifted, articles may be steamed without being submerged directly in the water.

A utensil of this kind will be found very convenient for cooking many different articles.

What I claim is:

A cooking utensil comprising an outer pot having at its upper portion a notched internal rest flange, of an inner pot having an out-turned upper edge adapted to engage said rest flange and support the inner pot slightly above the bottom of the outer pot, said inner pot having circumferentially spaced lugs located materially above its bottom, adapted to be moved upward through the notches of said rest flange and to be set upon said rest flange by a slight rotation of the said inner pot, to support the latter in a raised position, a cover having a flange adapted to be telescoped into the inner pot and having a projecting peripheral flange adapted to overlap the upper edge of the outer pot, the said peripheral flange of said cover having diametrically opposite notches, and the said inner pot having a bail adapted to project upward through said notches and to be held in an upright position thereby, and adapted also to be turned downward into engagement with said rest flange and to be covered by the peripheral flange of said cover, substantially as described.

In testimony whereof I affix my signature in presence of two witnesses.

CHARLES K. GRIVE.

Witnesses:
 HARRY D. KILGORE,
 BERNICE G. WHEELER.